US006607788B1

(12) United States Patent
Wegner et al.

(10) Patent No.: US 6,607,788 B1
(45) Date of Patent: Aug. 19, 2003

(54) METHOD FOR PRODUCING MULTILAYER COATINGS

(75) Inventors: Egon Wegner, Münster (DE); Gudrun Wiemann, Münster (DE); Ekkehard Sapper, Rimpar (DE); Harald Angermüller, Würzburg (DE)

(73) Assignee: BASF Coatings AG, Münster (DE)

( * ) Notice: Subject to any disclaimer, the term of this patent is extended or adjusted under 35 U.S.C. 154(b) by 0 days.

(21) Appl. No.: 09/486,103

(22) PCT Filed: Jul. 31, 1998

(86) PCT No.: PCT/EP98/04802

§ 371 (c)(1),
(2), (4) Date: Apr. 18, 2000

(87) PCT Pub. No.: WO99/10439

PCT Pub. Date: Mar. 4, 1999

(30) Foreign Application Priority Data

Aug. 22, 1997 (DE) .......................................... 197 36 535

(51) Int. Cl.$^7$ .............................. B05D 1/36; B05D 3/02; C09D 4/00
(52) U.S. Cl. ................................ 427/388.4; 427/385.5; 427/388.1; 427/407.1; 427/409; 524/457; 524/458; 524/460; 524/461
(58) Field of Search .............................. 427/407.1, 409, 427/410, 299, 327, 385.5, 388.1, 388.4; 524/458, 460, 461, 591, 437, 457; 525/125

(56) References Cited

U.S. PATENT DOCUMENTS

| | | | |
|---|---|---|---|
| 5,334,420 A | * 8/1994 | Hartung et al. | 427/407.1 |
| 6,001,424 A | * 12/1999 | Lettmann et al. | 427/407.1 |
| 6,001,915 A | * 12/1999 | Schwarte et al. | 524/457 |
| 6,129,989 A | * 10/2000 | Sapper | 427/407.1 |

FOREIGN PATENT DOCUMENTS

| | | | |
|---|---|---|---|
| EP | WO91/15528 A1 | 10/1991 | C08F/299/06 |
| EP | 0 522 420 A2 | 6/1992 | C08J/3/03 |

* cited by examiner

*Primary Examiner*—Shrive P. Beck
*Assistant Examiner*—Kirsten Crockford Jolley

(57) ABSTRACT

The invention embraces basecoating compositions comprising as binder constituents (i) an acrylate dispersion having a content of from 30 to 60% by weight of $C_1$–$C_8$-alkyl (meth)acrylate-containing monomers, from 30 to 60% by weight of vinylaromatic monomers and from 0.5 to 10% by weight of (meth)acrylic acid in the polymer, and (ii) a dispersion of a polymer which is obtainable by subjecting an ethylenically unsaturated monomer or a mixture of ethylenically unsaturated monomers to free-radical polymerization in the presence of a water-insoluble initiator or of a mixture of water-insoluble initiators and in an aqueous dispersion of a polyurethane resin which has a number-average molecular weight Mn of from 1000 to 30,000 daltons and comprises on average from 0.05 to 1.1 polymerizable double bonds per molecule, the weight ratio between the polyurethane resin and the ethylenically unsaturated monomers or the mixture of ethylenically unsaturated monomers lying between 1:10 and 10:1, and (iii) a Theological assistant which comprises a synthetic polymer having ionic and/or associative groups. Also embraced are processes for producing multicoat coating systems with coats of the said basecoating compositions, and substrates coated with such multicoat coating systems.

11 Claims, No Drawings

METHOD FOR PRODUCING MULTILAYER COATINGS

FIELD OF THE INVENTION

The present invention relates to aqueous basecoat compositions which comprise as binder constituents an aqueous acrylate dispersion (i), an aqueous polyurethane resin dispersion (ii) and a rheological assistant (iii).

PRIOR ART

The prior art discloses processes for coating motor vehicle bodies, especially car bodies, in which the substrate is generally first coated with an electrodeposition coating material and/or intermediate stone-chip primer or with a surfacer coat and subsequently, using a coating material comprising at least one pigment, a basecoat film is applied and this basecoat film is overcoated if desired with a transparent coating material. The resulting single-coat or multicoat paint system is subsequently baked. The basecoats used to produce the basecoat film are normally water- or solvent-based systems. As principal binder they comprise, in general, polyurethane dispersions or acrylate dispersions in combination with water-miscible, crosslinkable polyesters and with water-miscible melamine resins.

DE-A 43 39 870 describes basecoats comprising as binder a polymer which is obtainable by subjecting an ethylenically unsaturated monomer or a mixture of ethylenically unsaturated monomers to free-radical polymerization in the presence of a water-insoluble initiator or of a mixture of water-insoluble initiators and in an aqueous dispersion of a polyurethane resin which has a number-average molecular weight Mn of from 1000 to 30,000 daltons and comprises on average from 0.05 to 1.1 polymerizable double bonds per molecule, the weight ratio between the polyurethane resin and the ethylenically unsaturated monomer or the mixture of ethylenically unsaturated monomers lying between 1:10 and 10:1.

Basecoats in accordance with DE-A 43 39 870 feature enhanced stability on storage, very good adhesion between basecoat film and substrate, and very good resistance to atmospheric humidity.

The as yet unpublished German Patent Application P 195 47 944.0 describes basecoats which are additionally compatible with customary clearcoats, such as, for example, aqueous or solvent-containing clearcoats or transparent powder coating materials, as a result of which such clearcoats can be applied to the basecoat without any accompanying deterioration in the appearance of the paint system.

The subject of German Patent Application P 195 47 944.0 is a process for producing a multicoat coating system on a substrate surface, wherein (A) an aqueous coating composition comprising an aqueous polymer dispersion as film former is applied as basecoat to a substrate surface coated with a customary surfacer, (B) a suitable transparent topcoating composition is applied to the resulting basecoat film, and (C) the basecoat film is baked together with the topcoat film, the basecoat comprising an aqueous polymer dispersion, which comprises (i) an acrylate dispersion having a content of from 30 to 60% by weight of $C_1$–$C_8$-alkyl (meth)acrylate-containing monomers, from 30 to 60% by weight of vinylaromatic monomers and from 0.5 to 10% by weight of (meth)acrylic acid and (ii) a rheological assistant which is a synthetic polymer having ionic and/or associative groups.

A further subject of P 195 47 944.0 is a process for repairing multicoat paint systems, in which (D) a basecoat film applied to a customary surfacer is repaired with an aqueous coating composition comprising an aqueous polymer dispersion as film former, (E) the coating obtained in stage (D) is coated with a suitable transparent topcoating composition, and (F) the basecoat film is baked together with the topcoat film, the basecoating composition comprising an aqueous polymer dispersion which comprises (i) an acrylate dispersion having a content of from 30 to 60% by weight of $C_1$–$C_8$-alkyl (meth)acrylate-containing monomers, from 30 to 60% by weight of vinylaromatic monomers and from 0.5 to 10% by weight of (meth)acrylic acid and (ii) a Theological assistant which is a synthetic polymer having ionic and/or associative groups.

To basecoats in accordance with P 195 47 944.0 it is possible to apply any desired transparent coating materials, such as, for example, aqueous or solvent-containing coating materials or else powder coating materials and also powder slurry coating materials, which is not possible in the processes known from the prior art. Coatings which comprise the basecoat film used in accordance with the invention can be repaired without problems in cases of damage.

Problem and Solution

It has been found that the basecoats in accordance with German Patent Application P 195 47 944.0, despite their excellent spectrum of properties, still exhibit relatively poor adhesion to the transparent topcoats, especially to 2-component clearcoats and to powder slurry clearcoats as topcoat.

Although this effect can be ameliorated slightly by replacing all of the binder employed in the basecoat in accordance with P 195 47 944.0 by the binder known from DE-A 43 39 870, the adhesion of basecoats modified in such a manner, following exposure in the condensation test, is still unsatisfactory.

It has surprisingly been found that basecoat compositions comprising as binder constituents (i) a conventional acrylate dispersion having a content of from 30 to 60% by weight of $C_1$–$C_8$-alkyl (meth)acrylate-containing monomers, from 30 to 60% by weight of vinylaromatic monomers and from 0.5 to 10% by weight of (meth)acrylic acid, based in each case on the acrylate copolymer, and (ii) a dispersion of a polymer which is obtainable conventionally by subjecting an ethylenically unsaturated monomer or a mixture of ethylenically unsaturated monomers to free-radical polymerization in the presence of a water-insoluble initiator or of a mixture of water-insoluble initiators and in an aqueous dispersion of a polyurethane resin which has a number-average molecular weight Mn of from 1000 to 30,000 daltons and comprises on average from 0.05 to 1.1 polymerizable double bonds per molecule, the weight ratio between the polyurethane resin and the ethylenically unsaturated monomer or the mixture of ethylenically unsaturated monomers lying between 1:10 and 10:1, and (iii) a Theological assistant which preferably comprises a synthetic polymer having ionic and/or associative groups, and, if desired, an inorganic Theological assistant as well, provide an outstanding solution to this problem, the proportion of component (i) lying between 10 and 80% by weight, with particular preference between 20 and 60% by weight, and the proportion of component (ii) lying between 20 and 90% by weight, with particular preference between 40 and 80% by weight, based in each case on the sum of the proportions by weight of components (i) and (ii).

The invention additionally embraces processes for producing a multicoat coating system on a substrate surface, by (A) applying to a substrate surface coated beforehand with a customary surfacer or, if desired, with a known aqueous water-based coating material, for example a thin-film surfacer in accordance with DE-A 44 38 504, the aqueous basecoat composition of the invention, (B) applying a suitable transparent topcoating composition to the resulting basecoat film, and (C) baking the basecoat film and also, if present, the surfacer coat and/or the first basecoat film together with the topcoat film.

Implementation of the Invention

Component (i) consists of an aqueous dispersion of a copolymer of from 30 to 60% by weight, based on the acrylate copolymer, of $C_1$–$C_8$-alkyl (meth)acrylates, it being possible to employ the linear and branched-chain derivatives. As examples, mention may be made in particular of methyl (meth)acrylate, ethyl (meth)acrylate, n-propyl and isopropyl (meth)acrylate, n-butyl and isobutyl (meth) acrylate and 2-ethylhexyl (meth)acrylate, or mixtures of these monomers. As further monomers it is also possible to employ (meth)acrylamide monomers and their derivatives and also (meth)acrylonitrile.

As vinylaromatic monomers it is possible as constituents of component (i) to employ, in proportions of from 30 to 60% by weight, based on the acrylate copolymer, styrene, alpha-alkylstyrene and vinyltoluene, for example.

The acrylate dispersion (i) can be prepared by processes known from the prior art. The ratio between the monomers and the water can be selected such that the resulting dispersion has a solids content of preferably from 30 to 60% by weight.

As emulsifier it is preferred to employ an anionic emulsifier, alone or in a mixture with others. Examples of anionic emulsifiers are the alkali metal salts of sulphuric monoesters of alkylphenols or alcohols, and also the sulphuric monoesters of ethoxylated alkylphenols or ethoxylated alcohols, preferably the alkali metal salts of the sulphuric monoester of a nonylphenol reacted with from 4 to 5 mol of ethylene oxide per mole, alkyl- or arylsulphonates, sodium lauryl sulphate, sodium lauryl ethoxylate sulphate and secondary sodium alkanesulphonates whose carbon chain contains 8 to 20 carbon atoms. The amount of anionic emulsifier is from 0.1 to 5.0% by weight, based on the monomers, preferably from 0.5 to 3.0% by weight. Furthermore, in order to increase the stability of the aqueous dispersions (i), it is possible in addition to employ a nonionic emulsifier of the type of an ethoxylated alkylphenol or fatty alcohol, for example an adduct of 1 mol of nonylphenol and 4 to 30 mol of ethylene oxide in a mixture with the anionic emulsifier.

The minimum film-forming temperature (MFT) of the acrylate (co)polymer lies preferably between −30° C. and 60° C., with particular preference between 0° C. and 30° C. The acrylate polymer employed in accordance with the invention preferably has a number-average molecular weight Mn of from 200,000 to 2,000,000 daltons, preferably from 300,000 to 1,500,000 daltons (determination: by gel permeation chromatography with polystyrene as standard).

Component (ii) of the basecoat of the invention consists of an aqueous dispersion of a polymer which, as described in DE-A-43 39 870, is obtainable by subjecting an ethylenically unsaturated monomer or a mixture of ethylenically unsaturated monomers to free-radical polymerization in the presence of a water-insoluble initiator or of a mixture of water-insoluble initiators and in an aqueous dispersion of a polyurethane resin which has a number-average molecular weight Mn of from 1000 to 30,000 daltons and comprises on average from 0.05 to 1.1 polymerizable double bonds per molecule, the weight ratio between the polyurethane resin and the ethylenically unsaturated monomer or the mixture of ethylenically unsaturated monomers lying between 1:10 and 10:1. It is preferably anionic and has an acid number of between 20 and 60 mg of KOH/g.

The aqueous dispersion of the polyurethane resin in which the ethylenically unsaturated monomer or the mixture of ethylenically unsaturated monomers is subjected to free-radical polymerization in the presence of a water-insoluble initiator or of a mixture of water-insoluble initiators is preparable, in accordance with DE-A 43 39 870, by using (a) a polyester- and/or polyetherpolyol having a number-average molecular weight of from 400 to 5000 daltons, or a mixture of such polyester- and/or polyetherpolyols, and (b) a polyisocyanate or a mixture of polyisocyanates, alone or together with a monoisocyanate or with a mixture of monoisocyanates, and (c) a compound whose molecule contains at least one isocyanate-reactive group and at least one group which is capable of forming anions, or a mixture of such compounds, or (d) a compound whose molecule contains at least one NCO-reactive group and at least one poly(oxyalkylene) group, or a mixture of such compounds, or (e) a mixture of components (c) and (d), and (f) if desired, a compound which in addition to a polymerizable double bond also comprises at least one further NCO-reactive group, or a mixture of such compounds, and (g) if desired, a hydroxyl- and/or amino-containing organic compound having a molecular weight of from 60 to 399 daltons, or a mixture of such compounds, to prepare a polyurethane resin which has a number-average molecular weight Mn of from 1000 to 30,000 daltons, preferably from 1500 to 20,000 daltons and comprises on average from 0.05 to 1.1, preferably from 0.2 to 0.9 polymerizable double bonds, and dispersing this resin in water.

The polyurethane resin can be prepared either in bulk or in organic solvents.

The polyurethane resin can be prepared by simultaneously reacting all of the starting compounds. In many cases, however, it is judicious to prepare the polyurethane resin in stages. Thus it is possible, for example, to prepare from components (a) and (b) an isocyanate-functional prepolymer which is then reacted further with component (c) or (d) or (e). It is also possible to prepare from components (a) and (b) and (c) or (d) or (e) and, if desired, (f) an isocyanate-functional prepolymer which can then be reacted with component (g) to give a polyurethane resin of relatively high molecular mass. The reaction with component (g) can be carried out in bulk or—as described for example in EP-A 0 297 576—in water. In the cases where use is made as component (f) of a compound which comprises only one isocyanate-reactive group, it is possible in a first stage to prepare from (b) and (f) an isocyanate-functional precursor which can subsequently be reacted further with the other components.

The reaction of components (a) to (g) can also be carried out in the presence of catalysts, such as dibutyltin dilaurate, dibutyltin maleate and tertiary amines, for example.

The amounts of component (a), (b), (c), (d), (e), (f) and (g) to be employed result from the target number-average molecular weight Mn and from the target acid number. The polymerizable double bonds can be introduced into the polyurethane molecules by using (a) components having polymerizable double bonds and/or (b) components having polymerizable double bonds and/or by the component (f). It is preferred to introduce the polymerizable double bonds by way of component (f). It is additionally preferred, as groups containing polymerizable double bonds, to introduce acrylate, methacrylate or allyl ether groups into the polyurethane resin molecules.

As component (a) it is possible to employ saturated and insaburated polyester- and/or polyether polyols, especially polyester- and/or polyetherdiols having a number-average molecular weight of from 400 to 5000 daltons. Such components are taught in. DE-A 43 39 870.

As component (b) it is possible to employ aliphatic and/or cycloaliphatic and/or aromatic polyisocyanates. Examples of aromatic polyisocyanates arc phenylene diisocyanate, tolylene diisocyanate, xylylenc diisocyanate, bipbenylene duisocyanate, maptihylene diisocyannate and diphenylmlethane diisocyanate. Owing to their good resistance to ultraviolet light, (cyclo)aliphatic polyisocyanates give rise to products having little tendency to yellowing Such components (b) are taught in DE-A43 39 870.

In order to be able to disperse the said polyurethane resin stably in water it must comprise hydrophilic groups. These hydrophilic groups are introduced into the polyurethane resin by component (c) or component (d) or component (e). The groups of component (c) that are capable of forming anions are neutralized with a base, preferably ammonia or a tertiary amine, such as dimethylethanolamine, triethylamine, tripropylamine and tributylamine, for example, prior to or during the dispersion of the polyurethane resin in water, so that after neutralization the polyurethane resin comprises anionic groups. In the case where component (c) is employed exclusively as the component supplying hydrophilic groups, component (c) is employed in an amount such that the polyurethane resin has an acid number of from 15 to 80 mg of KOH/g, preferably from 20 to 60 mg of KOH/g. In the case where component (d) is employed exclusively as the component supplying hydrophilic groups, component (d) is employed in an amount such that the polyurethane resin comprises from 5 to 40% by weight, preferably from 10 to 30% by weight of oxyalkylene groups, it being necessary to include in any calculation oxyalkylene groups introduced, if appropriate, by component (a). In the case where component (e) is employed as the component supplying hydrophilic groups, the amounts of component (c) and (d) to be employed lie, in accordance with their mutual proportion in the mixture, between the values indicated above for the cases where components (c) and (d) respectively are employed as sole supplier of hydrophilic groups. For the rest, the skilled worker can readily determine the amounts of component (c), (d) or (e) to be employed by simple routine experiments. All he or she need do by means of simple series of experiments is to examine how high the proportion of hydrophilic groups must be, at least, to obtain a stable aqueous polyurethane resin dispersion. He or she can of course also use generally conventional dispersing auxiliaries, such as emulsifiers, for example, as well in order to stabilize the polyurethane resin dispersions. The additional use of dispersing auxiliaries, however, is not preferred since they generally increase the sensitivity of the resulting basecoats to moisture.

As component (c), it is preferred to employ compounds which comprise two isocyanate-reactive groups in the molecule. Suitable isocyanate-reactive groups are, in particular, hydroxyl groups, and also primary and/or secondary amino groups. Suitable groups capable of forming anions are carboxyl groups, sulphonic acid groups and/or phosphonic acid groups, preference being given to carboxyl groups. Regarding components (c) in detail reference may be made to DE-A 43 39 870.

With the aid of component (d) it is possible to introduce poly(oxyalkylene) groups as nonionic stabilizing groups into the polyurethane molecules. As component (d) it is possible, for example, to employ alkoxypoly(oxyalkylene) alcohols of the general formula R'O—(—$CH_2$—CHR"—O—)$_n$—H in which R' is an alkyl radical having 1 to 6 carbon atoms, R" is a hydrogen atom or an alkyl radical having 1 to 6 carbon atoms, and n is a number between 20 and 75.

Component (f) is used to introduce polymerizable double bonds into the polyurethane resin molecules. It is preferred as component (f) to employ a compound which comprises at least one NCO-reactive group and one polymerizable double bond. Particular preference is given to employing, as component (f), compounds which in addition to a polymerizable double bond also comprise two NCO-reactive groups. Examples of NCO-reactive groups are —OH, —SH, >NH and —$NH_2$ groups, preference being given to —OH, >NH and $NH_2$ groups. Examples of compounds which can be employed as component (f) are hydroxy (meth)acrylates, especially hydroxyalkyl (meth)acrylates, such as hydroxyethyl, hydroxypropyl, hydroxybutyl or hydroxyhexyl (meth)-acrylate and 2,3-dihydroxypropyl (meth) acrylate, 2,3-dihydroxypropyl monoallyl ether, glyceryl mono-(meth)acrylate, glyceryl monoallyl ether, pentaerythrityl mono(meth)acrylate, pentaerythrityl di(meth)acrylate, pentaerythrityl monoallyl ether, pentaerythrityl diallyl ether, trimethylolpropane monoallyl ether, trimethylolpropane mono(meth)acrylate and trimethylolpropane diallyl ether. As component (f) it is preferred to employ glyceryl mono (meth)acrylate, pentaerythrityl di(meth)acrylate, pentaerythrityl diallyl ether and trimethylolpropane mono(meth) acrylate. As component (f) it is particularly preferred to employ trimethylolpropane monoallyl ether, glyceryl monoallyl ether and allyl 2,3-dihydroxypropanoate. It is preferred to incorporate the (f) components which comprise at least two NCO-reactive groups into the polyurethane molecules at sites within the chain (not at the ends).

As component (g) it is possible, for example, to employ polyols having molecular weights of between 60 and 399 daltons, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, ditrimethylolpropane ether, pentaerythritol, 1,2-cyclohexanediol, 1,4-cyclohexane-dimethanol, bisphenol A, bisphenol F, neopentyl glycol, neopentyl glycol hydroxypivalate, hydroxyethylated or hydroxypropylated bisphenol A, hydrogenated bisphenol A, and mixtures thereof. The polyols are generally employed in amounts of up to 30% by weight, preferably from 2 to 20% by weight, based on the amount of component (a) and (g) employed.

As component (g) it is also possible to employ di- and/or polyamines having primary and/or secondary amino groups. Polyamines are essentially alkylene-polyamines having molecular weights of between 60 and 399 daltons. They can carry substituents which have no isocyanate-reactive hydrogen atoms. Examples are polyamines with a linear or branched aliphatic, cycloaliphatic or aromatic structure and with at least two primary amino groups. Diamines which may be mentioned are hydrazine, ethylenediamine, propylenediamine, 1,4-butylenediamine, piperazine, 1,4-cyclohexyldimethylamine, 1,6-hexa-methylenediamine, trimethylhexamethylenediamine, menthanediamine, isophoronediamine, 4,4'-diamino-dicyclohexylmethane and aminoethylethanolamine. Preferred diamines are hydrazine, alkyl- or cycloalkyldiamines, such as propylenediamine and 1-amino-3-aminomethyl-3,5,5-trimethylcyclohexane. It is also possible to employ as component (g) polyamines which comprise more than two amino groups in the molecule. In these cases, however, it must be ensured—for example by using monoamines as well—that no crosslinked polyurethane resins are obtained. Such polyamines which can be used are diethylenetriamine, triethylenetetramine, dipropylenetriamine and dibutylenetriamine. An example of a monoamine is ethylhexylamine.

The binder present in component (ii) of the invention is obtainable by subjecting an ethylenically unsaturated monomer or a mixture of ethylenically unsaturated monomers to free-radical polymerization in the presence of a water-insoluble initiator or of a mixture of water-insoluble initiators and in the aqueous polyurethane resin dispersion described above, the weight ratio between the polyurethane resin and the ethylenically unsaturated monomer or the mixture of ethylenically unsaturated monomers lying between 1:10 and 10:1, preferably between 1:2 and 2:1.

Ethylenically unsaturated monomers which can be employed are:

($\alpha$) aliphatic or cycloaliphatic esters of acrylic acid or methacrylic acid which contain neither hydroxyl nor carboxyl groups, or a mixture of such esters, and ($\beta$) ethylenically unsaturated monomers which carry at least one hydroxyl group in the molecule, or a mixture of such monomers, and ($\gamma$) ethylenically unsaturated monomers which carry at least one carboxyl group in the molecule, or a mixture of such monomers, and ($\delta$) further ethylenically unsaturated monomers, other than ($\alpha$), ($\beta$) and ($\gamma$) or a mixture of such monomers, and ($\epsilon$) polyunsaturated monomers, especially ethylenically polyunsaturated monomers and also mixtures of components ($\alpha$), ($\beta$), ($\gamma$), ($\delta$) and ($\epsilon$).

As ethylenically unsaturated monomers it is preferred to employ mixtures consisting of from 40 to 100% by weight, preferably from 60 to 90% by weight of component ($\alpha$), from 0 to 30% by weight, preferably from 0 to 25% by weight of component ($\beta$), from 0 to 10% by weight, preferably from 0 to 5% by weight and, with very particular preference, 0% by weight of component ($\gamma$) and from 0 to 50% by weight, preferably from 0 to 30% by weight of component ($\delta$) and also from 0 to 5% by weight, preferably 0% by weight of component ($\gamma$), the sum of the proportions by weight of ($\alpha$), ($\beta$), ($\gamma$), ($\delta$) and ($\epsilon$) always being 100% by weight.

As component ($\alpha$), it is possible, for example, to employ cyclohexyl acrylate, cyclohexyl methacrylate, alkyl acrylates and alkyl methacrylates having up to 20 carbon atoms in the alkyl radical, such as methyl, ethyl, propyl, butyl, hexyl, ethylhexyl, stearyl and lauryl acrylate and methacrylate, or mixtures of these monomers.

As component ($\beta$), it is possible, for example, to employ hydroxyalkyl esters of acrylic acid, methacrylic acid or another alpha,beta-ethylenically unsaturated carboxylic acid. These esters can be derived from an alkylene glycol, which is esterified with the acid, or they can be obtained by reacting the acid with an alkylene oxide. As component ($\beta$) it is preferred to employ hydroxyalkyl esters of acrylic acid and methacrylic acid in which the hydroxyalkyl group contains up to 6 carbon atoms, or mixtures of these hydroxyalkyl esters. Examples in this context can be found in DE-A 43 39 870.

As component ($\gamma$) it is preferred to employ acrylic acid and/or methacrylic acid. Alternatively, other ethylenically unsaturated acids having up to 6 carbon atoms in the molecule can be employed. Examples of such acids are ethacrylic acid, crotonic acid, maleic acid, fumaric acid and itaconic acid.

As component ($\delta$), it is possible, for example, to employ vinylaromatic hydrocarbons, such as styrene, alpha-alkylstyrene and vinyltoluene, acrylamide and methacrylamide and acrylonitrile and methacrylonitrile, or mixtures of these monomers.

As components ($\epsilon$) it is possible to employ compounds which comprise at least two free-radically polymerizable double bonds in the molecule. Examples are divinylbenzene, p-methyldivinylbenzene, o-nonyl-divinylbenzene, ethanediol di(meth)acrylate, 1,4-butanediol di(meth)acrylate, 1,6-hexanediol di(meth)acrylate, trimethylolpropane tri(meth)acrylate, pentaerythrityl di(meth)acrylate, allyl methacrylate, diallyl phthalate, butanediol divinyl ether, divinyl-ethyleneurea, divinylpropyleneurea, diallyl maleate, etc.

Examples of water-insoluble initiators which can be employed are water-insoluble azo compounds and water-insoluble peroxy compounds. Examples of water-insoluble azo compounds are 2,2-azobis(isobutyronitrile), 2,2'-azobis (isovaleronitrile), 1,1'-azobis(cyclohexane-carbonitrile) and 2,2'-azobis(2,4-dimethylvalero-nitrile). Examples of water-insoluble peroxy compounds are t-amyl peroxyethylhexanoate, t-butylperoxy-ethylhexanoate, dilauryl peroxide, dibenzoyl peroxide and 1,1-dimethyl-3-hydroxy-1-butyl peroxyethyl-hexanoate.

It is of course also possible to add polymerization regulators.

The polymerization of the ethylenically unsaturated monomer or of the mixture of ethylenically unsaturated monomers can be carried out by adding the ethylenically unsaturated monomer or the mixture of ethylenically unsaturated monomers slowly to the aqueous polyurethane resin dispersion. In this context it is possible either to add the entire amount of the monomers at once or else to include only part in an initial charge and to meter in the remainder during the course of the reaction. Alternatively, the monomers to be polymerized can be brought, with the aid of a portion of the polyurethane resin dispersion and water, into the form of a pre-emulsion which is then added slowly to the initial charge. The feed time for the monomers to be polymerized amounts in general to from 2 to 8 hours, preferably from about 3 to 4 hours.

The water-insoluble initiators can be added to the initial charge or can be added dropwise together with the monomers. They can also be added proportionately to the initial charge which comprises a portion of the monomers. The remainder of initiator is then metered in with the remaining monomers. The reaction temperature depends on the rate of dissociation of the initiator or initiator mixture and can be lowered, if desired, by means of suitable organic redox systems. Polymerization of the ethylenically unsaturated monomer or of the mixture of ethylenically unsaturated monomers takes place in general at a temperature of from 30 to 100° C., in particular at a temperature of from 60 to 95° C. When operating at superatmospheric pressure, the reaction temperatures may exceed 100° C.

The ethylenically unsaturated monomer or the mixture of ethylenically unsaturated monomers is to be selected such that the binder polymers obtained in the manner described above have a hydroxyl number of from 0 to 100 mg of KOH/g, preferably from 0 to 80 mg of KOH/g and an acid number of from 10 to 40 mg of KOH/g, preferably from 15 to 30 mg of KOH/g.

As Theological assistants of component (iii) of the basecoat composition, synthetic polymers having ionic and/or associative groups are particularly suitable. Examples of these are polyvinyl alcohol, poly(meth)acrylamide, poly (meth)acrylic acid, polyvinylpyrrolidone, styrene-maleic anhydride or ethylenemaleic anhydride copolymers and their derivatives or else hydrophobically modified ethoxylated urethanes or polyacrylates. Particular preference is given to using carboxyl-containing polyacrylate copolymers having an acid number of from 60 to 780 mg of KOH/g, in particular from 200 to 500 mg of KOH/g. The Theological assistant is intended to give the basecoat composition the desired viscosity, in particular at the pH employed. For this reason, particular suitability is possessed by ionic acrylate dispersions which form fibrelike gels at the pH values which are present in the paint system prior to curing and so settle over the other constituents or bind them loosely, as a result of which a filmlike structure is obtained even prior to the baking or drying of the coating material. It is particularly preferred to employ polyacrylic acid dispersions which may, if desired, be present as polymers with further comonomers. The rheological assistant is present in the basecoat composition used in accordance with the invention in an amount, preferably, of from 0.01 to 5.0% by weight, in particular from about 0.1 to 1% by weight, based on the solids content. Examples of further suitable rheological assistants are xanthan gum, diurea compounds, polyurethane thickeners, bentonite, waxes and wax copolymers and, preferably, ionic phyllosilicates, and mixtures thereof.

Particular preference as rheological assistants (iii) is given to mixtures of the abovementioned synthetic polymers having ionic or associative groups and the ionic phyllosilicates.

As crosslinkers it is possible in particular to employ the crosslinkers known in the coatings field, such as melamine resins or block polyisocyanates, which are able to react with free OH groups.

The coating composition of the invention may additionally include, as crosslinking auxiliary binders, epoxy-functional and/or carboxyl-functional constituents, such as customary glycidyl compounds, examples being glycidyl acrylate or glycidyl methacrylate. Examples of suitable carboxyl-functional crosslinkers are carboxylic acids, especially saturated, straight-chain, aliphatic dicarboxylic acids having 3 to 20 carbon atoms in the molecule, with dodecane-1,12-dioic acid being employed with preference.

As a further auxiliary binder it is also possible, if desired, to employ polyvinyl alcohol. It has been found that the addition of polyvinyl alcohol in an amount of up to 10% by weight, preferably from 1 to 5% by weight, makes it possible to improve the compatibility with the transparent topcoat compositions applied to the basecoat composition. Polyvinyl alcohol has a solvent-repelling effect, so that any solvent or other components possibly present in the topcoat composition are unable, owing to the repellent effect of the polyvinyl alcohol, to penetrate into the basecoat composition and alter the colour.

In addition to the polymers described above, the basecoat compositions may also include further compatible water-dilutable resins, examples being amino resins, polyesters, block polyurethanes, such as those described in DE-A 41 07 136, for example, and polyurethanes which generally serve as grinding resins for the pigments or as additional binders.

The basecoat compositions employed in accordance with the invention generally have a solids content of from about 15 to 60% by weight. The solids content varies with the intended use of the coating compositions. For metallic coating materials, for example, it is preferably from 12 to 25% by weight. For solid-colour coating materials it is higher, for example preferably from 25 to 60% by weight.

Components (i) and (ii) can be neutralized using amines (especially alkylamines), amino alcohols and cyclic amines, such as di- and triethylamine, amino methylpropanol, N,N-dimethylethanolamine, diiso-propanolamine, morpholine, N-alkylmorpholine. For neutralization, preference is given to readily volatile amines, and particular preference to ammonia. The aqueous coating composition is usually adjusted to a pH of between 6 and 9, preferably between 6.5 and 8.5 and, with particular preference, between 7.0 and 8.2.

The basecoat composition can include organic solvents in an amount of up to 15% by weight. Examples of suitable organic solvents are naphthalenes, benzenes and alcohols. Further organic solvents which may be present in the basecoats of the invention are alkylene glycols, such as ethylene glycol, propylene glycol, butylene glycol, 1,4-butanediol, 1,6-hexanediol, neopentyl glycol and other diols, such as dimethylolcyclohexane, and also, preferably, butyl glycol or ethylhexanol.

As pigments the basecoat composition can include customary pigments employed for coating car bodies, examples being special-effect pigments and also organic and inorganic colouring pigments.

Examples of suitable special-effect pigments are customary commercial aluminium bronzes, the aluminium bronzes chromatized in accordance with DE-A 36 36 183, customary commercial stainless steel bronzes, and also other customary metal platelets and metal flake pigments and also nonmetallic special-effect pigments, such as pearl lustre pigments and interference pigments, for example.

Examples of suitable inorganic colour pigments are titanium dioxide, iron oxides and carbon black and the like. Examples of organic colour pigments are Indanthrene blue, Cromophthal red, Irgazine orange, Sicotrans yellow, Heliogen green and the like. It is also possible for anticorrosive pigments such as zinc phosphate, to be present.

In addition, the basecoat composition may also include extenders which are customary in the field of paint chemistry. These include silica, magnesium silicate, titanium dioxide and barium sulphate.

The proportion of pigments and extenders in the coating composition of the invention can in total amount to from 3 to 65% by weight, based on the solids content. The pigment can be added in any desired manner: for example, as an aqueous slurry or as a paste. Such pastes preferably comprise a grinding binder, preferably based on polyurethane, such as, for example, the polyurethane resins described in DE-A 40 10 176 or DE-A 41 07 136, one of the abovementioned rheological assistants, deionized water, organic solvent, and the pigment or a mixture of pigments. If aluminium and/or flakes is/are employed, they are optionally suspended in solvents and, if appropriate, in a mixture of water and wetting agent or are dispersed in the principal binder or in another, auxiliary binder.

The amount of components (i) and (ii) may vary depending on the pigment employed. If the pigments are organic and/or inorganic colour pigments, then components (i) and (ii) are present in the basecoat composition preferably in an amount of from 10 to 60% by weight, based on the solids content of the basecoat composition. If the pigments are special-effect pigments, components (i) and (ii) are preferably present in the basecoat composition in an amount of from 30 to 80% by weight, based on the solids content of the basecoat composition.

As a further component the basecoat composition may include film-forming auxiliaries. Examples of suitable film-forming auxiliaries are dialkyl dicarboxylates, high-boiling benzines and naphthalenes, which have a boiling point above 100° C., preferably above 140° C.

The basecoat composition may, if desired, also comprise further auxiliaries and additives. Examples of these are catalysts, assistants, defoamers, dispersing auxiliaries, wetting agents, preferably carboxy-functional dispersants, antioxidants, UV absorbers, free-radical scavengers, levelling agents, biocides and/or water-retention agents.

The basecoat composition is applied to a substrate surface coated with a customary surfacer or, if desired, to a substrate surface that has already been coated with a first, preferably aqueous basecoat, for example a thin-film surfacer. As surfacers it is possible to employ any prior art surfacers which exhibit good physical drying. As aqueous thin-film surfacers it is preferred to employ the coating materials described in DE-A 44 38 504. In general, the surfacer coat, or the first basecoat film employed instead of the surfacer coat can be flashed off briefly before the basecoat film of the invention is applied.

Following the application of the surfacer or of the first basecoat, the basecoat composition according to the invention is applied in a conventional manner, for example by spraying, brushing, dipping, flooding, knifecoating or rolling, to the substrate, such as metal, plastic, wood or glass, for example.

Prior to application to the surfacer coat or to the first basecoat film employed instead of the surfacer coat, the basecoat composition may, if desired, be admixed with water in order to adjust the solids content, solvent or rheological assistant to adjust the performance properties, and, if desired, a base to regulate the pH. Should the viscosity still not lie within the desired range, it is possible to add further rheological assistant (iii) or other thickeners, which, if used, are added in an amount of from 0.001 to 0.2% by weight, based on the solids content.

The basecoat film of the invention that is applied to the substrate is generally overcoated with a suitable transparent topcoat. For applying the transparent topcoat it is advantageous briefly to flash off the coating composition, preferably for from 1 to 15 minutes and, in particular, for from 4 to 8 minutes at a temperature of from 60 to 100° C. The flashoff time depends on the temperature and can be adjusted over wide ranges.

As the transparent topcoat it is possible to apply all customary topcoats. Preference is given to the clearcoats used in the field of paint chemistry, such as water- or solvent-based clearcoats, transparent powder coating materials, powder slurry clearcoats, such in particular as those described in WO 96/32452, solvent-containing and aqueous two-component clearcoats, or others.

The transparent topcoat can be applied by customary processes known in the prior art.

A further subject of the present invention, accordingly, is a process for producing a substrate coated with a plurality of coats, the coating being applied to the substrate surface by (A) applying to a substrate surface coated with a customary surfacer or, if desired, with a first basecoat film, optionally after flashoff, the basecoat composition of the invention, which is likewise optionally flashed off, (B) applying a suitable transparent topcoat composition to the resulting basecoat film, and (C) baking the basecoat film and, if present, the surfacer coat or the first basecoat film together with the topcoat film.

In this process the baking temperatures are generally between 110 and 180° C., preferably between 130 and 155° C., and the baking times are between 10 and 45 minutes, preferably about 30 minutes.

When repairing multicoat coating systems it is possible to apply, without special aids, the basecoating composition to the substrate surface that is to be repaired.

The examples which follow are intended to illustrate the invention.

EXAMPLES

Example 1

Preparing the Basecoat B1 of the Invention

Example 1.1

Preparing a Millbase Paste 410.2 g of a grinding binder prepared in accordance with Example 1 of DE-A 40 10 176 are admixed in succession and with vigorous stirring with 175 g of a methanol-etherified melamine resin (HMMM from Dyno Cyanamid), 249.0 g of deionized water, 1.8 g of ammonia (25% strength aqueous solution), 2.5 g of a polyacrylic acid rheological assistant (Viscalex HV30: Allied Colloids), 25 g of butoxypropanol, 122.7 g of butyl glycol, 51 g of a 506 strength solution of tetramethyldecynediol in butyl glycol, 144.3 g of phthalocyanine green (Heliogen green L8730 from BASF AG), 36 g of phthalocyanine blue (Palomar blue from Mobay), 5.6 g of pigment-grade carbon black (FW2 from Degussa AG), 17.25 g of Aerosil R805 (from Degussa AG), 1.4 g of ammonia (25% strength aqueous solution) and 58 g of deionized water, the mixture is treated in a dissolver for 20 minutes at a maximum product temperature of 40° C., and the product is subsequently ground in a stirred mill to a fineness of from 5 to 10 µm (Hegmann wedge 15).

Example 1.2

Preparing the Basecoat B1 of the Invention

A. A mixing vessel is charged with 15.6 parts by weight of water and 0.5 part by weight of butyl glycol. With stirring, 8 parts by weight of aqueous acrylate dispersion Acronal® 290D (BASF AG) (component (i)), 20.8 parts by weight of aqueous polyurethane resin dispersion in accordance with Example 1 in DE-A 43 39 870 (component (ii)) and for neutralization, 0.07 part by weight of 25% strength aqueous ammonia solution are added.

The mixture obtained is admixed slowly with a mixture of 15 parts by weight of water, 1.66 parts by weight of Viscalex HV30 from Allied Colloids and, for further neutralization, 0.08 part by weight of a 25% strength aqueous ammonia solution. Subsequently, 26.0 parts by weight of the millbase paste prepared in Example 1.1 are added with vigorous stirring.

B. In a separate mixer, 2.8 parts by weight of a green pearl lustre pigment (Mearlin Extra Fine Green 839V from Mearl) and 3.9 parts by weight of butyl glcyol are mixed. This mixture is subsequently added in portions and with vigorous stirring to the mixture prepared in step A.

C. In a separate mixer, a mixture of 0.9 part by weight of a customary commercial aluminium bronze (Alu-Stapa Hydrolux VP51284/G from Eckart: aluminium content 65%) and 1.3 parts by weight of butyl glycol are stirred until smooth. This mixture is subsequently added in portions and with vigorous stirring to the mixture prepared in step The viscosity of the resulting coating material is adjusted with deionized water to about 90 mPas at 1000/s.

Example 2 (Comparative)

Preparing Basecoats C1 and C2

The basecoats C1, where only Acronal® 290D (component (i)) is employed, and C2, where only the polyurethane resin dispersion of Example 1 of D-A 43 89 870 (component (ii)) is employed, are formulated as comparative examples.

With regard to the other components, the basecoats B1, C1 and C2 are identical, as shown in the following table (in the order of their addition according to Example 1):

TABLE 1

Compositions of the basecoats B1, C1 and C2

| Component/parts by weight | B1 | C1 | C2 |
|---|---|---|---|
| Component (i) | 8.0 | 22.5 | — |
| Component (ii) | 20.8 | — | 31.8 |
| Deionized water | 15.6 | 15.6 | 15.6 |
| Butyl glycol | 0.5 | 0.5 | 0.5 |
| Aqueous ammonia (25%) | 0.07 | 0.07 | 0.07 |
| Aqueous acrylate copolymer-rheological assistant (30%) | 1.66 | 1.66 | 1.66 |
| Deionized water | 15.0 | 15.0 | 15.0 |
| Aqueous ammonia (25%) | 0.08 | 0.08 | 0.08 |
| Millbase paste | 26.0 | 26.0 | 26.0 |
| Mearlin Extra Fine Green 839V | 2.8 | 2.8 | 2.8 |
| Butyl glycol | 3.9 | 3.9 | 3.9 |
| Alu-Stapa Hydrolux VP51284/G | 0.9 | 0.9 | 0.9 |
| Butyl glycol | 1.3 | 1.3 | 1.3 |

Example 3

Preparing the Thin-film Surfacer of DE-A 44 38 504

30.9 g of a binder prepared in accordance with Example 1 of DE-A 44 38 504 (31% solids content) are admixed in succession and with vigorous stirring with 0.5 g of Additol XW395 (from Hoechst AG), 1.8 g of a 50% strength solution of tetramethyldecynol in butyl glycol, 0.2 g of Aerosil R805 (from Degussa AG), 0.02 g of pigment-grade carbon black (FW2 from Degussa AG), 0.3 g of Titanrutil R900 (from DuPont), 3.45 g of Heliogen green L8730 (from BASF AG), 0.35 g of Bayferox (from Bayer AG), 2.95 g of Hostaperm-Gelb (yellow) H3G (from Hoechst AG), 4.0 g of Talkum 10 MO (from Luzenac), 3.1 g of Blanc Fixe Plv. F (from Sachtleben) and 7.5 g of deionized water, the mixture is treated in a dissolver for 20 minutes at a maximum temperature of 40° C., and the product is subsequently ground in a stirred mill to a fineness of from 10 to 15 µm (Hegmann wedge 25).

54.77 g of the millbase prepared in this way are admixed with vigorous stirring with 30.9 g of the binder prepared in accordance with Example 1 of DE-A 44 38 504 (31% solids content), 2.8 g of butyl glycol, 0.45 g of Byk-346 (from Byk-Gulden), 0. 9 g of Byketol WS (from Byk-Gulden), 1.5 g of Shellsol T (from Shell), 4 g of deionized water and 4.5 g of a 10% strength aqueous solution of dimethylethanol.

For application, the thin-film surfacer is adjusted with deionized water to a viscosity of 30 seconds in the DIN 4 cup.

Example 4

Producing Two-coat Coating Systems with the Basecoats B1, C1 and C2

The thin-film surfacer of Example 3 is first of all applied to a bodywork panel coated with a customary commercial electrodeposition coating material, left to evaporate at 20° C. for 5 minutes and kept at 80° C. for 5 minutes in a convection oven so that the dried thin-film surfacer has a dry-film thickness of about 15 µm.

After cooling to 20° C., the bodywork panel coated in this way is coated with the basecoats B1, C1 and C2 prepared in accordance with Example 2, left to evaporate at 20° C. for 5 minutes and kept at 80° C. for 5 minutes in a convection oven so that the dried basecoat film has a dry-film thickness of about 15 µm.

This system is coated with a powder slurry clearcoat in accordance with the example of WO 96/32452, left to evaporate at 20° C. for 5 minutes, pre-dried in a convection oven for 5 minutes at a panel temperature of 50° C. and finally baked at 150° C. for 30 minutes. The dry-film thickness of the clearcoat film is about 40 µm.

Example 5

Testing the Adhesion of the Clearcoat Film

Tests are carried out on the unexposed clearcoat film and following condensation exposure.

a) Testing the Unexposed Clearcoat Film:

A knife is used to make two parallel cuts (about 3 cm long and at a distance of about 1 cm) on the coated metal panel such that the depth of the cut reaches down to the panel.

A cloth adhesive tape from Beiersdorf is bonded at right angles over the scribe marks. The adhesive tape is pressed on firmly using a wooden spatula. Subsequently, the adhesive tape is torn off suddenly perpendicular to the substrate. This procedure is carried out 8 times at the same test site with fresh adhesive tape in each case. Assessment is made visually: if the coating shows no damage, it is assessed as "satisfactory" ("sat."). Paint delamination is assessed as "unsatisfactory" ("unsat.").

b) Adhesion Testing of the Clearcoat Film Exposed to Condensation:

The adhesion test is carried out after condensation exposure, which is conducted in accordance with DIN 5001KK, by means of the cross-cut test in accordance with EN ISO 2409 after 0 and 2 hours of regeneration, respectively.

TABLE 2

Results of the adhesion tests

| Basecoat | B1 | C1 | C2 |
| --- | --- | --- | --- |
| Clearcoat adhesion unexposed | sat. | unsat. | sat. |
| Adhesion, condensation: | 0 | 5 | 5 |
| 0 h regeneration | | | |
| 2 h regeneration | 0 | 2 | 5 |

What is claimed is:

1. Basecoat composition comprising as binder constituents
   (i) a conventional acrylate dispersion having a content of from 30 to 60% by weight of $C_1$–$C_8$- alkyl (meth) acrylate-containing monomers, from 30 to 60% by weight of vinylaromatic monomers and from 0.5 to 10% by weight of (meth)acrylic acid in the polymer, and
   (ii) a dispersion of a polymer which is obtained by subjecting an ethylenically unsaturated monomer or a mixture of ethylenically unsaturated monomers to free-radical polymerization in the presence of a water-insoluble initiator or a mixture of water-insoluble initiators and in an aqueous dispersion of a polyurethane resin which has a number-average molecular weight Mn of from 1000 to 30,000 daltons and comprises on average from 0.05 to 1.1 polymerizable double bonds per molecule, the weight ratio between the polyurethane resin and the ethylenically unsaturated monomer or the mixture of ethylenically unsaturated monomers is between 1:10 and 10:1, and
   (iii) a rheological assistant which comprises a synthetic polymer having ionic and/or associative groups,
   wherein the proportion of component (i) is between 10 and 80% by weights and the proportion of component (ii) is between 20 and 90% by weight, based in each case on the sum of the proportions by weight of components (i) and (ii), wherein a clearcoat applied to the basecoat demonstrates adhesion to the basecoat following exposure to condensation testing.

2. Basecoat composition according to claim 1, wherein the proportion of component (i) is between 20 and 60% by weight and the proportion of component (ii) is between 40 and 80% by weight, based in each case on the sum of the proportions by weight of components (i) and (ii).

3. Basecoat composition according to claim 1, wherein component (iii) additionally comprises an anionic phyllosilicate.

4. Basecoat a composition according to claim 1, characterized in that the basecoat composition comprises from 3 to 65% by weight, based on the solids content, of pigments and extenders.

5. Process for producing a multicoat coating system on a substrate surface, comprising
   (A) applying to a substrate a first coating selected from the group consisting of surfacer coatings and aqueous water-based coating materials, to form a first coating film, followed by applying the basecoat composition according to claim 1 to form a basecoat film,
   (B) applying a suitable transparent topcoat composition to the resulting basecoat film, and
   (C) baking the basecoat film and the first coating film together with the topcoat film.

6. Process according to claim 5, wherein a two-component clearcoat or a powder slurry clearcoat is employed as transparent topcoat composition in stage (B).

7. A process according to claim 5, further comprising the step of flash dying the first coating film for a period of from 1 to 15 minutes at a temperature of between 60 to 100° C.

8. A process according to claim 5, further comprising the step of flash drying the basecoat layer applied over a first coating film for a period of from 1 to 15 minutes at a temperature of between 60 to 100° C.

9. A process according to claim 7, further comprising the step of flash drying the basecoat layer applied over a first coating film layer for a period of from 1 to 15 minutes at a temperature of between 60 to 100° C.

10. A basecoat composition comprising
    (i) an acrylate dispersion having a content of from 30 to 60% by weight of $C_1$–$C_8$-alkyl (meth)acrylate-containing monomers, from 30 to 60% by weight of vinylaromatic monomers and from 0.5 to 10% by weight of (meth)acrylic acid in the polymer, and
    (ii) a dispersion of a polymer which is obtained by subjecting an ethylenically unsaturated monomer or a mixture of ethylenically unsaturated monomers to free-radical polymerization in the presence of a water-insoluble initiator or a mixture of water-insoluble initiators and in an aqueous dispersion of a polyurethane resin which has a number-average molecular weight Mn of from 1000 to 30,000 daltons and comprises on average from 0.05 to 1.1 polymerizable double bonds per molecule, the weight ratio between the polyurethane resin and the ethylenically unsaturated monomer or the mixture of ethylenically unsaturated monomers is between 1:10 0 and 10:1, and
    (iii) a rheological assistant which comprises a synthetic polymer having ionic and or associative groups,
    wherein the proportion of component (i) is between 10 and 80% by weight, and the proportion of component (ii) is between 20 and 90% by weight, based in each case on the sum of the proportions by weight of components (i) and (ii), wherein, when used as a basecoat having a clearcoat applied thereover and a cured film formed therefrom, the clearcoat film demonstrates no delamination following condensation exposure according to DIN 5001KK and adbesion testing according to EN ISO 2409.

11. Process for producing a multicoat coating system on a substrate surface, comprising
    (A) applying to a substrate a first coating selected from the group consisting of surfacer coatings and aqueous water-based coating materials, to form a first coating film, followed by applying a basecoat composition to form a basecoat film, said basecoat comprising
      (i) a conventional acrylate dispersion laving a content of from 30 to 60% by weight of $C_1$–$C_8$-alkyl (meth) acrylate-containing monomers, from 30 to 60%/o by weight of vinylaromatic monomers and from 0.5 to 10% by weight of (meth)acrylic acid in the polymer, and
      (ii) a dispersion of a polymer which is obtained by subjecting an ethylenically unsaturated monomer or a mixture of ethylenically unsaturated monomers to free-radical polymerization in the presence of a water-insoluble initiator or a mixture of water-insoluble initiators and in an aqueous dispersion of a polyurethane resin which has a number-average molecular weight Mn of from 1000 to 30,000 daltons and comprises on average from 0.05 to 1.1 polymerizable double bonds per molecule, the weight ratio between the polyurethane resin and the ethylenically unsaturated monomer or the mixture of ethylenically unsaturated monomers is between 1:10 and 10:1, and (iii) a rheological assistant which comprises a synthetic polymer having ionic and/or associative groups, wherein the proportion of component (i) is between 10 and 80% by weight, and the proportion of component (ii) is between 20 and 90% by weight, based in each case on the sum of the proportions by weight of component (i) and (ii), (B) applying a suitable transparent topcoat composition to the resulting basecoat film, and (C) baking the basecoat film and the first coating film together with the topcoat film, wherein the baked topcoat film demonstrates no delamination following condensation exposure according to DIN 5001KK and adhesion testing according to EN ISO 2409.

* * * * *